United States Patent
Chen et al.

(10) Patent No.: US 9,564,830 B2
(45) Date of Patent: Feb. 7, 2017

(54) CONTROL METHOD OF INVERTING APPARATUS FOR ACHIEVING MPPT AND INVERTING APPARATUS THEREOF

(71) Applicant: FSP TECHNOLOGY INC., Taoyuan (TW)

(72) Inventors: Han-Wei Chen, Taoyuan (TW); Chun-Hao Yu, Taoyuan (TW); Chia-Hua Liu, Taoyuan (TW)

(73) Assignee: FSP TECHNOLOGY INC., Taoyuan (TW)

(*) Notice: Subject to any disclaimer, the term of this patent is extended or adjusted under 35 U.S.C. 154(b) by 38 days.

(21) Appl. No.: 14/631,850

(22) Filed: Feb. 26, 2015

(65) Prior Publication Data
US 2015/0244286 A1    Aug. 27, 2015

Related U.S. Application Data
(60) Provisional application No. 61/944,587, filed on Feb. 26, 2014.

(30) Foreign Application Priority Data
Feb. 5, 2015 (TW) .............................. 104103880 A

(51) Int. Cl.
| | |
|---|---|
| *H02M 7/44* | (2006.01) |
| *H02M 1/00* | (2006.01) |
| *H02M 7/48* | (2007.01) |
| *G05F 1/67* | (2006.01) |
| *H02J 3/38* | (2006.01) |

(52) U.S. Cl.
CPC .................. *H02M 7/48* (2013.01); *G05F 1/67* (2013.01); *H02J 3/385* (2013.01); *Y02E 10/58* (2013.01)

(58) Field of Classification Search
CPC .............. G05F 1/67; G05F 1/66; H02J 3/385; H02J 3/383; Y02E 10/58; H02M 7/44; H02M 3/04; H02M 3/158; H02M 1/42; H02M 7/537; H02M 1/00; H02M 2001/0003; H02M 2001/0048; H02M 7/48
See application file for complete search history.

(56) References Cited

U.S. PATENT DOCUMENTS

| | | | |
|---|---|---|---|
| 8,531,855 B2* | 9/2013 | Lee ........................... | G05F 1/67 323/906 |
| 2005/0002214 A1* | 1/2005 | Deng ........................ | G05F 1/67 363/131 |

(Continued)

*Primary Examiner* — Nguyen Tran
*Assistant Examiner* — Gustavo Rosario Benitez
(74) *Attorney, Agent, or Firm* — Jianq Chyun IP Office

(57) ABSTRACT

An inverting apparatus and a control method thereof are provided. The inverting apparatus includes an inverting circuit, a detection circuit, and a control circuit. The control circuit is coupled to the inverting circuit and the detection circuit and configured to provide a control signal to control the inverting circuit so as to adjust a voltage value of an input voltage into a command voltage represented by the control signal. The control circuit calculates a voltage difference between the detected input voltage and the command voltage so as to determine whether the voltage difference is greater than a preset value. When determining that the voltage difference is greater than the preset value, the control circuit sets the voltage value of the command voltage as the voltage value of the current input voltage.

8 Claims, 4 Drawing Sheets

(56) References Cited

U.S. PATENT DOCUMENTS

| | | | | |
|---|---|---|---|---|
| 2009/0080226 A1* | 3/2009 | Fornage | ............... | G05F 1/67 |
| | | | | 363/74 |
| 2010/0156185 A1* | 6/2010 | Kim | ............... | H01M 16/003 |
| | | | | 307/72 |
| 2010/0156186 A1* | 6/2010 | Kim | ............... | H01M 16/003 |
| | | | | 307/72 |
| 2011/0242857 A1* | 10/2011 | Kim | ............ | H02J 3/385 |
| | | | | 363/21.1 |
| 2013/0027997 A1* | 1/2013 | Tan | ............. | G05F 1/67 |
| | | | | 363/95 |
| 2013/0127435 A1* | 5/2013 | Chen | ............ | G05F 1/67 |
| | | | | 323/304 |
| 2014/0103894 A1* | 4/2014 | McJimsey | ............ | G05F 1/67 |
| | | | | 323/282 |
| 2015/0244285 A1* | 8/2015 | Chen | ............ | G01R 21/06 |
| | | | | 363/95 |

\* cited by examiner

CONTROL METHOD OF INVERTING APPARATUS FOR ACHIEVING MPPT AND INVERTING APPARATUS THEREOF

CROSS-REFERENCE TO RELATED APPLICATION

This application claims the priority benefits of U.S. provisional application Ser. No. 61/944,587, filed on Feb. 26, 2014 and Taiwan application serial no. 104103880, filed on Feb. 5, 2015. The entirety of each of the above-mentioned patent applications is hereby incorporated by reference herein and made a part of this specification.

BACKGROUND OF THE INVENTION

Field of the Invention

The invention relates to a power conversion technique, and more particularly, to an inverting apparatus and a control method thereof.

Description of Related Art

In order to reduce the consumption of fossil fuels, applications of renewable energy have been vigorously developed for the power systems nowadays. The applications may include, for example, a photovoltaic module that generates power by solar energy, a wind power generation module that generates power by wind power, a hydroelectric power generation module that generates power by water flow or other renewable energy generation modules. However, since power is generated from natural resources for all of aforementioned renewable energy generation modules, their output power performance/output capability may be changed dramatically by influences from the environment.

For instance, take a DC current generation apparatus using the photovoltaic module (e.g., solar panel) as an example, variation of external conditions (e.g., weather conditions, a condition where the solar panel is sheltered or other possible conditions) is the major reason that changes the power performance/output capability of a DC power generated by the photovoltaic module.

Because most of the DC power generation apparatuses constituted by the renewable energy generation modules have an issue of unstable output capability, when these DC power generation apparatuses are applied in AC power systems, designs for an inverting apparatus of back-end must be adjusted in response to said issue. Otherwise, if the inverting apparatus of back-end fails to instantly respond to the changes in the power performance of the DC power generation apparatus of front-end (e.g., when a difference between an input voltage and a command voltage is too large), it often results in a system outage caused by the input voltage of the inverting apparatus which fails to follow the overly large command voltage.

SUMMARY OF THE INVENTION

The invention is directed to an inverting apparatus and a control method thereof, which are capable of solving the problem of system outage caused by the inverting apparatus which fails to respond instantly when the output capability of a DC power generation apparatus of front-end suddenly changes.

The inverting apparatus of the invention includes an inverting circuit, a detection circuit and a control circuit. The inverting circuit receives a DC input power and is configured to convert the DC input power into the AC output power. The detection circuit is configured to detect an input voltage and an input current of the DC input power. The control circuit is coupled to the inverting circuit and the detection circuit and configured to provide a control signal to control the inverting circuit so as to adjust a voltage value of an input voltage into a command voltage represented by the control signal. The control circuit calculates a voltage difference between the detected input voltage and the command voltage, and determines whether the voltage difference is greater than a preset value. When determining that the voltage difference is greater than the preset value, the control circuit sets the voltage value of the command voltage as the voltage value of the current input voltage.

In an embodiment of the invention, the control circuit includes a maximum power point tracking (MPPT) operation module, an adder and a drive circuit. The maximum power point tracking operation module is configured to sample the input voltage and the input current, calculate the voltage difference so as to determine whether the voltage difference is greater than the preset value, and accordingly generate a disturbing signal. The adder is coupled to the maximum power point tracking operation module, receives the disturbing signal and a reference signal, and accordingly generates the command voltage. The command voltage is a superimposition of the disturbed quantity represented by the disturbing signal and the voltage value of the command voltage at a previous time point represented by the reference signal. The drive circuit receives the command voltage and accordingly generates the control signal.

In an embodiment of the invention, when the MPPT operation module determines that the voltage difference is less than or equal to the preset value, the MPPT operation module adjusts the disturbing signal based on a maximum power point tracking operation.

In an embodiment of the invention, during the maximum power point tracking operation, the MPPT operation module calculates an input power according to the input voltage and the input current. When the control circuit determines that the voltage difference is less than or equal to the preset value, the MPPT operation module modulates the disturbed quantity by comparing the disturbed input power with the undisturbed input power so as to accordingly generate the corresponding disturbing signal so that the input power approaches a maximum input power.

In an embodiment of the invention, if the input power at the current time point is greater than the input power at the previous time point, the MPPT operation module provides the disturbed quantity with a disturbance direction identical to that of the previous time point. Further, if the input power at the current time point is less than or equal to the input power at the previous time point, the MPPT operation module provides the disturbed quantity with the disturbance direction opposite to that of the previous time point.

A control method of an inverting apparatus according to the invention is adapted for tracking a maximum input power of a DC input power received by the inverting apparatus. The control method includes the following steps: detecting an input voltage and an input current of the DC input power; providing a control signal to control the input voltage so as to adjust a voltage value of the input voltage into a command voltage represented by the control signal; calculating a voltage difference between the detected input voltage and the command voltage; determining whether the voltage difference is greater than a preset value; and when determining that the voltage difference is greater than the preset value, setting the voltage value of the command voltage as the voltage value of the current input voltage.

In an embodiment of the invention, the step of providing the control signal to control the input voltage so as to adjust the voltage value of the input voltage into the command voltage represented by the control signal includes: providing a disturbing signal representing a disturbed quantity; superimposing the disturbing signal onto a reference signal to accordingly generate the command voltage, wherein the command voltage is a superimposition of the disturbed quantity represented by the disturbing signal and the voltage value of the command voltage at a previous time point represented by the reference signal; and generating the control signal according to the command voltage.

In an embodiment of the invention, the control method of the inverting apparatus further includes the following step: when the voltage difference is less than or equal to the preset value, adjusting the disturbing signal based on a maximum power point tracking operation.

In an embodiment of the invention, the step of adjusting the disturbing signal based on the maximum power point tracking operation includes: calculating an input power according to the input voltage and the input current; comparing the disturbed input power with the undisturbed input power; and modulating the disturbed quantity according to a comparison result so as to generate the corresponding disturbing signal so that the input power approaches the maximum input power.

In an embodiment of the invention, the step of modulating the disturbed quantity according to the comparison result so that the input power approaches the maximum input power includes: determining whether the input power at a current time point is greater than the input power at the previous time point; if the input power at the current time point is greater than the input power at the previous time point, providing the disturbed quantity with a disturbance direction identical to that of the previous time point; and if the input power at the current time point is less than or equal to the input power at the previous time point, providing the disturbed quantity with the disturbance direction opposite to that of the previous time point.

Based on the above, the inverting apparatus and the control method thereof as proposed in the embodiments of the invention are capable of determining whether a power performance of a DC input power shifts by calculating the voltage difference between an input voltage and a command voltage, and comparing whether the voltage difference exceeds a preset value. When determining that the power performance of the DC input power shifts, the control method of the invention may set the command voltage as the current input voltage and performs the maximum power point tracking operation based on the set value of the command voltage, so as to prevent the system outage caused by the input voltage which fails to follow the overly large command voltage.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
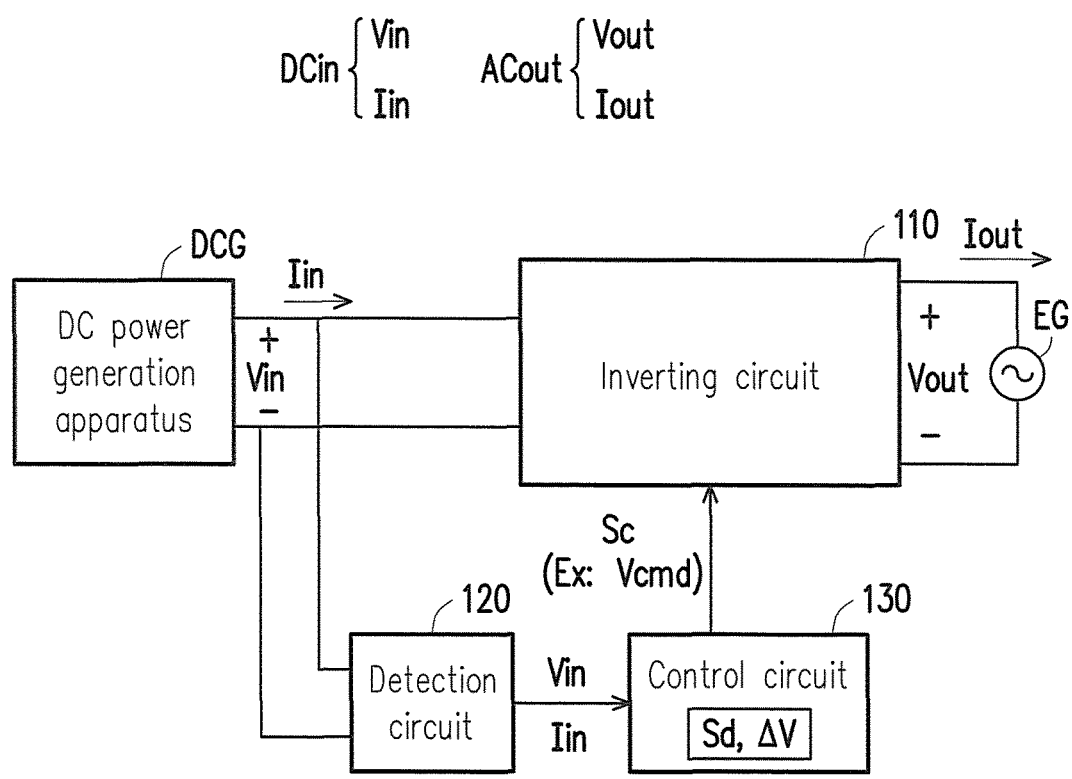
FIG. 1 is a schematic diagram of an inverting apparatus according to an embodiment of the invention.

In order to make content of the present disclosure more comprehensible, embodiments are described below as the examples to prove that the present disclosure can actually be realized. Moreover, elements/components/steps with same reference numerals represent same or similar parts in the drawings and embodiments.

FIG. 1 is a schematic diagram of an inverting apparatus according to an embodiment of the invention. Referring to FIG. 1, an inverting apparatus 100 of the present embodiment is adapted for applications in an AC power system. In said AC power system, the inverting apparatus 100 may receive a DC input power DCin (including a DC input voltage Vin and an input current Iin) from a DC power generation apparatus DCG of front-end, and accordingly generate an AC output power ACout (including an AC output voltage Vout and an output current Iout) to be provided to a power grid EG of back-end. Herein, said DC power generation apparatus DCG may be, for example, a photovoltaic module, a wind power generation module, a hydroelectric power generation module or other renewable energy generation modules, but the invention is not limited thereto.

In the present embodiment, the inverting apparatus 100 includes an inverting circuit 110, a detection circuit 120 and a control circuit 130. The inverting circuit receives the DC input power DCin and is configured to convert the DC input power into the AC output power ACout. A circuit configuration of the inverting circuit 110 may be of, for example, a half-bridge asymmetric type, a half-bridge symmetric type, a full-bridge type or other suitable inverting circuit configurations, which are not particularly limited by the invention.

The detection circuit 120 is coupled to an input terminal of the inverting circuit 110 to detect the input voltage Vin and the input voltage Iin of the DC input power DCin and output information of the detected input voltage Vin and the input current Iin to the control circuit 130 as a reference for controlling.

The control circuit 130 is coupled to the inverting circuit 110 and the detection circuit 120. The control circuit 130 is configured to control a power conversion of the inverting circuit 110 and a size of the input voltage Vin of the DC input power DCin so as to maintain a utilization rate of the DC power generation apparatus DCG of front-end at a specific level. For instance, the control circuit 130 may generate a control signal Sc to control a DC-to-AC conversion of the inverting circuit 110. The control signal Sc may be, for example, a PWM signal for controlling a switching cycle of the inverting circuit 110, but the invention is not limited thereto. On the other hand, the control circuit 130 may also provide a disturbing signal Sd to disturb a size of a voltage value of the input voltage Vin, so as to realize a control mechanism of maximum power point tracking (MPPT) so that an output power of the DC power generation apparatus DCG of front-end may approach a maximum power within the specification.

Specifically, the inverting circuit 110 of the present embodiment may adjust the voltage value of the input voltage Vin into a command voltage Vcmd represented by the control signal Sc according to the received control signal Sc. For instance, if the current input voltage Vin is 5V while the control circuit 130 determines that the input voltage Vin for allowing the DC power generation apparatus DCG of front-end to include a maximum output power is 3V, the control circuit 130 may provide the control signal Sc corresponding to the command voltage Vcmd being 3V to the inverting circuit 110 at this time so that the inverting circuit 110 may gradually reduce the input voltage Vin from 5V to 3V in response to the control signal Sc.

In the present embodiment, the control circuit 130 basically sets the command voltage Vcmd according to the control mechanism of MPPT, and accordingly generate the corresponding control signal Sc to control the DC input power DCin so that the output power of the DC power generation apparatus DCG of front-end may approach a maximum power point. However, when a difference between the input voltage Vin and the set command voltage Vcmd is too large, the control circuit 130 may adjust a set value of the command voltage Vcmd so as to prevent the system outage caused by the actual input voltage Vin which fails to follow the overly large command voltage Vcmd.

Specifically, a power performance/output capability of the DC power generation apparatus DCG of front-end does not maintain being regulated but changes at any time due to variation of some of the external conditions. For instance, if the DC power generation apparatus DCG of front-end is the photovoltaic module constituted by a solar panel, the power performance/output capability of the solar panel can be easily affected by the weather. If the solar panel is sheltered, the input current Iin may suddenly drop to change the power performance thereof accordingly. In this case, if the control circuit 130 continues to generate the control signal Sc to control the inverting circuit 110 by the set value of the command voltage Vcmd at a previous period, the inverting circuit 110 cannot operate continually.

In order to solve aforementioned problem, the control circuit 130 of the present embodiment calculates a voltage difference between the detected input voltage Vin and the command voltage Vcmd to serve as a determination reference for setting the command voltage Vcmd. Herein, the control circuit 130 determines whether the voltage difference between the input voltage Vin and the command voltage Vcmd is greater than a preset value. When the control circuit 130 determines that the calculated voltage difference is less than or equal to the preset value, it indicates that a shifting occurred on the power performance of the DC power generation apparatus DCG of front-end is not significantly large. Accordingly, the control circuit 130 may adjust the command voltage Vcmd based on a MPPT operation, and sets the input voltage Vin to follow the voltage value of the command voltage Vcmd so that the DC input power DCin can include the maximum power. Otherwise, when the control circuit 130 determines that the voltage difference is greater than the preset value, it indicates that the reason why a curve of the power performance of the DC power generation apparatus DCG shifts is caused by variation of the external conditions. In this case, the control circuit 130 sets the voltage value of the command voltage Vcmd as the voltage value of the current input voltage Vin. In other words, in the circumstance where the voltage difference between the input voltage Vin and the command voltage Vcmd exceeds the preset value, the control circuit 130 sets the voltage value of the command voltage Vcmd to follow the current input voltage Vin, and performs the MPPT operation based on the set value of the command voltage Vcmd, so as to prevent the system outage caused by the input voltage Vin which fails to follow the overly large command voltage Vcmd.

Figure 2:
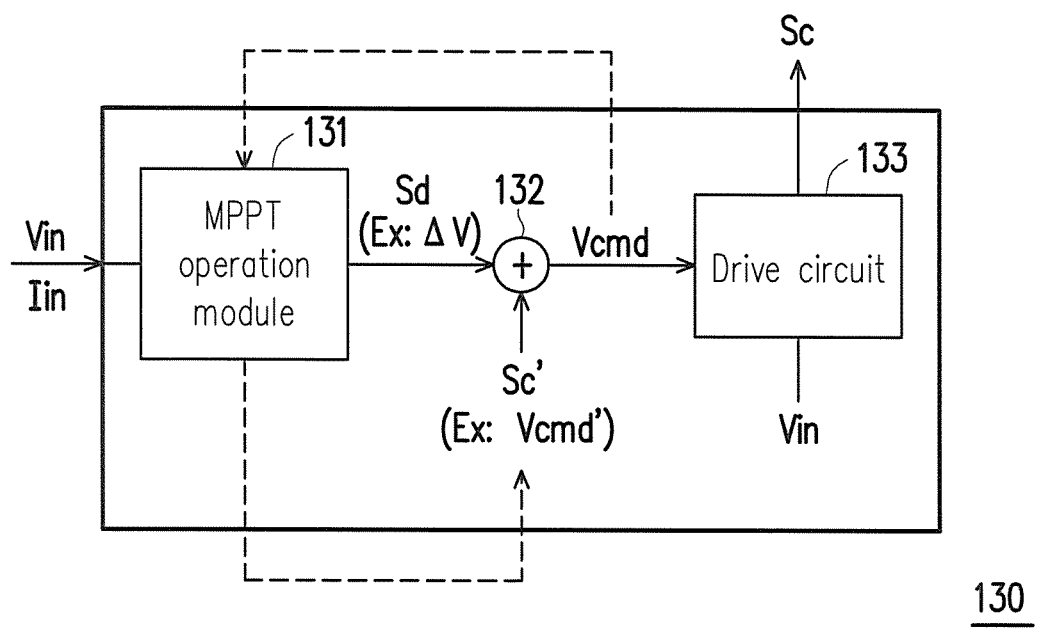
FIG. 2 is a schematic diagram of a control circuit according to an embodiment of the invention.

A specific system architecture of the control circuit 130 is as shown by FIG. 2. Referring to FIG. 2, the control circuit 130 includes a MPPT operation module 131 (i.e., a maximum power point tracking operation module), an adder 132 and a drive circuit 133.

In the present embodiment, the MPPT operation module 131 samples the input voltage Vin and the input current Iin, calculates the voltage difference between the input voltage Vin and the command voltage Vcmd so as to determine whether the voltage difference is greater than the preset value, and accordingly generates the disturbing signal Sd. Herein, when the MPPT operation module 131 determines that the voltage difference is less than or equal to the preset value, the MPPT operation module 131 adjusts the disturbing signal Sd based on the MPPT operation. When the MPPT operation module 131 determines that the voltage difference is greater than or equal to the preset value, the MPPT operation module 131 does not perform the MPPT operation, and instead, the control circuit 130 sets the voltage value of the command voltage Vcmd to follow the current input voltage Vin (i.e., sets the voltage value of the command voltage as the voltage value of the current input voltage).

During the MPPT operation, the MPPT operation module 131 of the control circuit 130 calculates the input power according to the input voltage Vin and the input current Iin, and modulates a disturbed quantity $\Delta V$ by comparing the disturbed input power with the undisturbed input power so as to accordingly generate the corresponding disturbing signal Sd. For instance, if the input power at a current time point is greater than the input power at a previous time point, the disturbing signal Sd provided by the MPPT operation module 131 has the disturbed quantity $\Delta V$ with a disturbance direction identical to that of the previous time point (which is represented by a positive disturbed quantity $+\Delta V$), and if the input power at the current time point is less than or equal to the input power at the previous time point, the disturbing signal Sd provided by the MPPT operation module 131 has the disturbed quantity $\Delta V$ with the disturbance direction opposite to that of the previous time point (which is represented by a negative disturbed quantity $-\Delta V$).

Subsequently, the adder 132 is utilized to superimpose the disturbing signal Sd onto a reference signal Sc' so as to generate the corresponding command voltage Vcmd to be provided to the drive circuit 133. In other words, the command voltage Vcmd generated by the adder 132 is a superimposition of the disturbed quantity $\Delta V$ represented by the disturbing signal Sd and the voltage value represented by the reference signal Sc'. In the present embodiment, the voltage value represented by the reference signal Sc' is a command voltage Vcmd' at the previous time point. Therefore, the command voltage Vcmd generated by the adder 132 is practically equal to a superimposition of the disturbed quantity $\Delta V$ and the command voltage Vcmd' at the previous time point (i.e., Vcmd=Vcmd'+$\Delta V$ or Vcmd=Vcmd'−$\Delta V$). Accordingly, the drive circuit 133 may generate the corresponding control signal Sc based on the set command voltage Vcmd to control operations of the inverting circuit 110. Herein, the drive circuit 133 of the present embodiment further includes a pulse width modulation generation circuit, which generates the control signal Sc that is the PWM signal for controlling the switching cycle of the inverting circuit 110.

Figure 3:
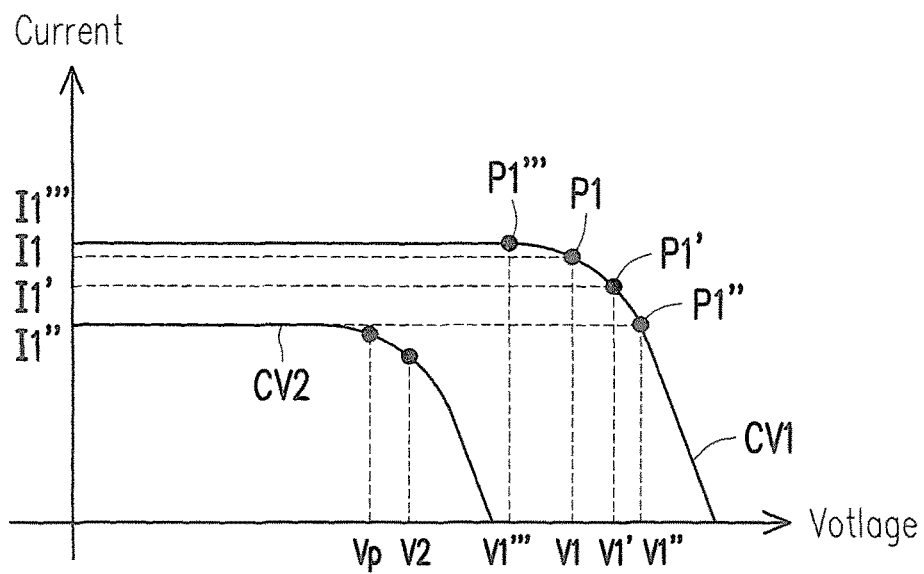
FIG. 3 is a schematic diagram illustrating a voltage-to-current relation of the DC input power according to an embodiment of the invention.

For instance, with reference to FIG. 3, it is assumed that the input voltage Vin at the current time point is a voltage value V1' and the input voltage Vin at the previous time point is a voltage value V1". The control circuit provides the disturbed quantity ΔV with the negative disturbance direction (i.e., for decreasing the voltage) in between said time points. In this case, according to the input voltage Vin and the input current Iin, the control circuit 130 may calculate that an input power P1' at the current time point is V1'×I1' and an input power P1" at the previous time point is V1"×I1". Herein, the control circuit 130 may determine that the current input power P1' is greater than the input power P1" at the previous time point so as to continue providing the disturbed quantity ΔV with the disturbance direction identical to that of the previous time point (i.e., making V1'=V1"−ΔV), such that the input voltage Vin may approach towards a voltage value V1 having a maximum input power P1.

On the other hand, if the input voltage Vin at the current time point is the voltage value V1" and the input voltage Vin at the previous time point is the voltage value V1. The control circuit 130 may provide the disturbed quantity ΔV with the negative disturbance direction in between said time points. In this case, because the control circuit 130 calculates that the input power P1'" at the current time point (which is equal to V1'"×I1'") is less than input power P1 at the previous time point according to the input voltage Vin and the input current Iin, the control circuit 130 may change to provide the disturbed quantity ΔV with the positive disturbance direction (i.e., making V1'"=V1+ΔV) so that the input voltage Vin may approach the voltage value V1 having the maximum input power P1.

Figure 4:
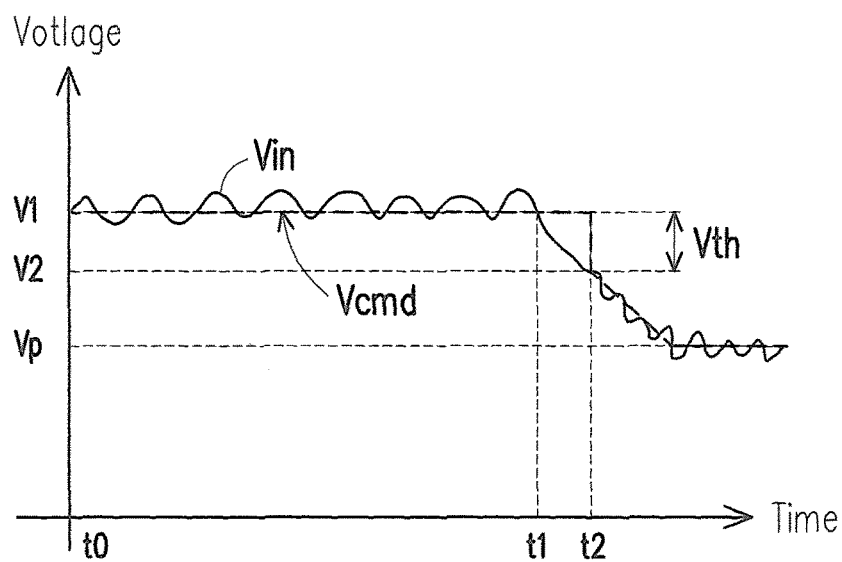
FIG. 4 is a schematic diagram illustrating a time-to-voltage relation of the DC input power according to an embodiment of the invention.

A specific control flow of the inverting apparatus 100 according to the embodiments of the inventions is described below with reference to FIG. 3 and FIG. 4. Herein, FIG. 3 illustrates a relation between the input voltage Vin and the input current Iin of the DC power generation apparatus DCG under different external conditions. FIG. 4 illustrates a relation between time and the input voltage Vin for the DC input power DCin.

Referring to FIG. 3 and FIG. 4 together, in the present embodiment, the power performance of the DC power generation apparatus DCG within a period from time points t0 to t1 may be represented by using a characteristic curve CV1. During said period, the control circuit 130 first sets the voltage value V1 matching to a maximum power point of the characteristic curve CV1 as the set value of the current command voltage Vcmd.

Specifically, during the period from t0 to t1, because the power performance of the DC power generation apparatus DCG shows no significant changes, the control circuit 130 determines that the voltage difference (i.e., |V1−Vin|) between the command voltage Vcmd and the input voltage Vin is less than the preset value. In this case, the control circuit 130 executes the MPPT operation so as to generate the corresponding control signal Sc based on the set voltage value V1 to control the operations of the inverting circuit 110. Herein, the control circuit 130 may increase or decrease the disturbed quantity in response to the disturbing signal Sd to increase or decrease the size of the voltage value of the input voltage Vin, so as to adjust the voltage value of the input voltage Vin into the voltage value V1 of the command voltage Vcmd.

From the aspect of time, as shown by a waveform of the input voltage Vin within the period from t0 to t1 in FIG. 4, the input voltage Vin vibrates back and forth near the voltage value V1 in response to the variation from the disturbed quantity ΔV within the period for approaching the voltage value V1 of the command voltage Vcmd, so as to be dynamically stabilized on the voltage value V1.

Subsequently, during a period from the time points t1 to t2, the power performance of the DC power generation apparatus DCG changes from the characteristic curve CV1 to a characteristic curve CV2 in response to variation of the external conditions. In this case, because the voltage difference between input voltage Vin and the command voltage Vcmd does not exceed the a preset value Vth, the control circuit 130 is still unable to determine that variation has occurred on the external conditions. Therefore, the control circuit 130 still sets the command voltage Vcmd as the voltage value V1 during the period from t1 to t2. Accordingly, during such period, because the input voltage Vin is less than the command voltage Vcmd, the input voltage 110 will stop switching.

At the time point t2, the voltage difference between the input voltage Vin and the command voltage Vcmd reaches the preset value Vth. In this case, according to the voltage difference, the control circuit 130 determines that variation of the external conditions has already caused the curve of the power performance of the DC power generation apparatus DCG to shift. As such, the control circuit 130 changes to set the command voltage Vcmd from the voltage value V1 to a voltage value V2 at the time point t2. Accordingly, during this period, the inverting circuit 110 makes the input voltage Vin to vibrate again near the voltage value V2 in response to the control signal Sc.

Thereafter, the control circuit 130 may adjust the command voltage Vcmd and input voltage Vin in a manner similar to aforesaid MPPT control method, so that the command voltage Vcmd and the input voltage Vin may be stabilized at a voltage value Vp corresponding to the maximum power point on the characteristic curve CV2 after a period of time.

Figure 5:
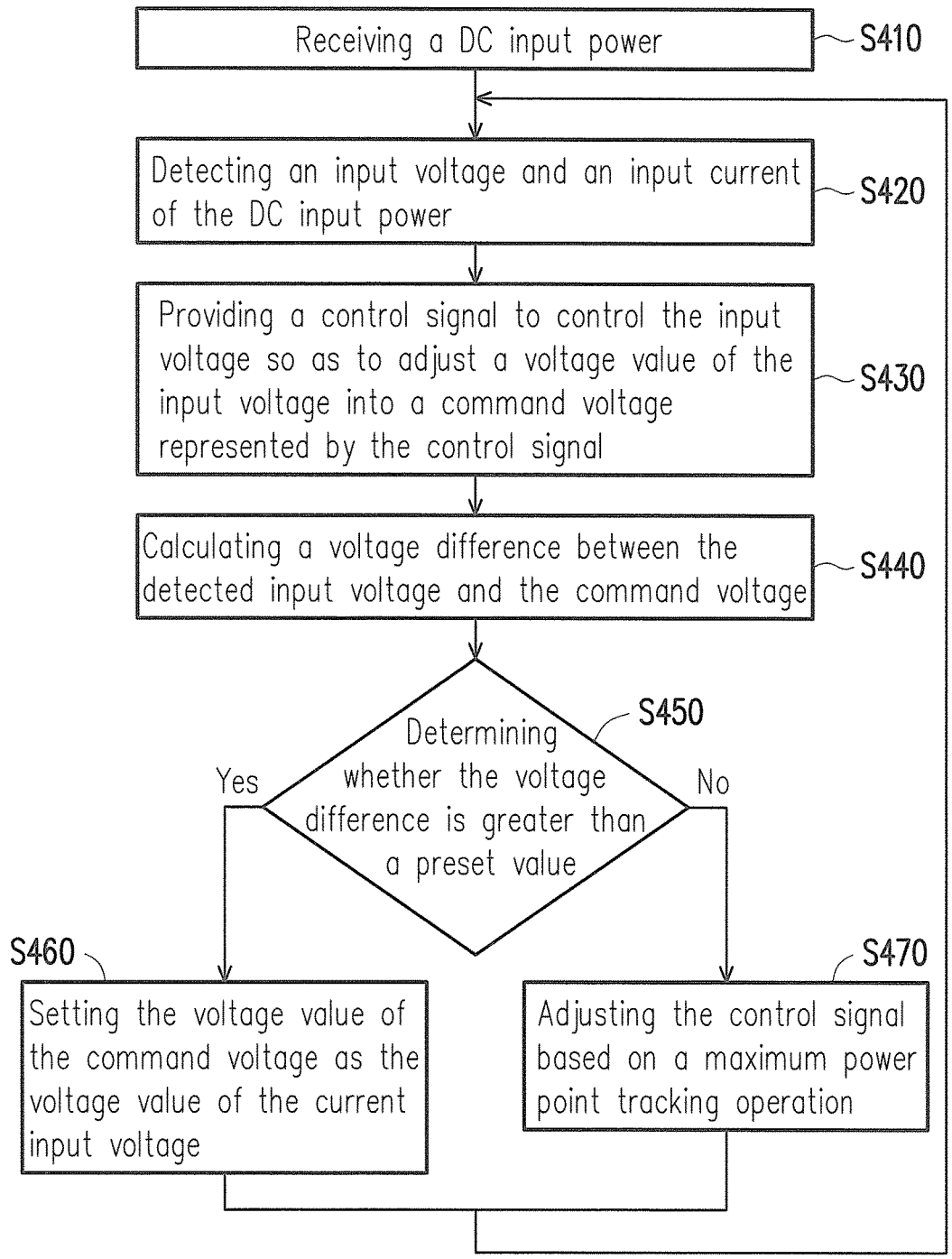
FIG. 5 is a flowchart of a control method of the inverting apparatus according to an embodiment of the invention.

FIG. 5 is a flowchart of a control method of the inverting apparatus according to an embodiment of the invention. The control method of the inverting apparatus according to the present embodiment may be applied in the inverting apparatus 100 depicted in the embodiment of FIG. 1, but the invention is not limited thereto. In the control method of the present embodiment, first, a DC input power DCin is received by an inverting circuit (e.g., 110) (step S410), and an input voltage Vin and an input current Iin of the DC input power DCin are detected by a detection circuit (e.g., 120) (step S420). Subsequently, a control signal Sc is provided by the control circuit (e.g., 130) to control the input voltage Vin so as to adjust a voltage value of the input voltage Vin into a command voltage Vcmd represented by the control signal Sc (step S430). Thereafter, a voltage difference between the detected input voltage Vin and the command voltage Vcmd is calculated by the control circuit (step S440), and whether the voltage difference is greater than a preset value is determined accordingly (step S450).

If the determination in step S450 is yes, the voltage value of the command voltage Vcmd is set as the voltage value of the current input voltage Vin by the control circuit (step S460). Otherwise, if determination in step S450 is no, a disturbing signal Sd generated by the control circuit is adjusted based on a MPPT operation (step S470), so that an input power of the DC input power DCin may be substantially maintained near the maximum power point.

The control method described in the embodiment of FIG. 4 may obtain sufficient supports and teachings from the descriptions for FIG. 1 to FIG. 3, thus similar or repeated parts thereof are not omitted hereinafter.

In summary, the inverting apparatus and the control method thereof as proposed in the embodiments of the invention are capable of determining whether a power performance of a DC input power shifts by calculating the voltage difference between an input voltage and a command voltage, and comparing whether the voltage difference exceeds a preset value. When determining that the power performance of the DC input power shifts, the control method of the invention may set the command voltage as the current input voltage and performs the maximum power point tracking operation based on the set value of the command voltage, so as to prevent the system outage caused by the input voltage which fails to follow the overly large command voltage.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An inverting apparatus, comprising: an inverting circuit, receiving a DC input and configured to convert the DC input into an AC output; a detection circuit, configured to detect an input voltage and an input current of the DC input; and a control circuit, coupled to the inverting circuit and the detection circuit, and configured to provide a control signal to control the inverting circuit such as to adjust a voltage value of the input voltage into a command voltage included by the control signal, wherein the control circuit calculates a voltage difference between the detected input voltage and the command voltage, and determines whether the voltage difference is greater than a preset value, and when determining that the voltage difference is greater than the preset value, the control circuit sets the voltage value of the command voltage equal to the voltage value of the input voltage, wherein the control circuit comprises: a maximum power point tracking operation module, configured to sample the input voltage and the input current, calculate the voltage difference so as to determine whether the voltage difference is greater than the preset value, and accordingly generate a disturbing signal; an adder, coupled to the maximum power point tracking operation module, receiving the disturbing signal and a reference signal, and accordingly generating the command voltage, wherein the command voltage is a superimposition of a disturbed quantity included by the disturbing signal and the voltage value of the command voltage at a previous time point included by the reference signal; and a drive circuit, receiving the command voltage and accordingly generating the control signal.

2. The inverting apparatus of claim 1, wherein when the maximum power point tracking operation module determines that the voltage difference is less than or equal to the preset value, the maximum power point tracking operation module adjusts the disturbing signal based on a maximum power point tracking operation.

3. The inverting apparatus of claim 2, wherein during the maximum power point tracking operation, the maximum power point tracking operation module calculates an input power according to the input voltage and the input current, and when the control circuit determines that the voltage difference is less than or equal to the preset value, the maximum power point tracking operation module modulates the disturbed quantity by comparing the disturbed input power with the undisturbed input power, so as to generate the corresponding disturbing signal so that the input power approaches a maximum input power.

4. The inverting apparatus of claim 3, wherein if the input power at the current time point is greater than the input power at the previous time point, the maximum power point tracking operation module provides the disturbed quantity with a disturbance direction identical to that of the previous time point, and if the input power at the current time point is less than or equal to the input power at the previous time point, the maximum power point tracking operation module provides the disturbed quantity with the disturbance direction opposite to that of the previous time point.

5. A control method of an inverting apparatus; for achieving MPPT, and the control method comprising: detecting an input voltage and an input current of the DC input; providing a control signal to control the input voltage so as to adjust a voltage value of the input voltage into a command voltage included by the control signal; calculating a voltage difference between the detected input voltage and the command voltage; determining whether the voltage difference is greater than a preset value; and when determining that the voltage difference is greater than the preset value, setting the voltage value of the command voltage as the voltage value of the input voltage, wherein the step of providing the control signal to control the input voltage so as to adjust the voltage value of the input voltage into the command voltage included by the control signal comprises: providing a disturbing signal representing a disturbed quantity; superimposing the disturbing signal onto a reference signal to accordingly generate the command voltage, wherein the command voltage is a superimposition of the disturbed quantity included by the disturbing signal and the voltage value of the command voltage at a previous time point included by the reference signal; and generating the control signal according to the command voltage.

6. The control method of the inverting apparatus of claim 5, further comprising:
when the voltage difference is less than or equal to the preset value, adjusting the disturbing signal based on a maximum power point tracking operation.

7. The control method of the inverting apparatus of claim 6, wherein the step of adjusting the disturbing signal based on the maximum power point tracking operation comprises:
calculating an input power according to the input voltage and the input current;
comparing the disturbed input power with the undisturbed input power; and
modulating the disturbed quantity according to a comparison result so as to generate the corresponding disturbing signal so that the input power approaches the maximum input power.

8. The control method of the inverting apparatus of claim 7, wherein the step of modulating the disturbed quantity according to the comparison result so that the input power approaches the maximum input power comprises:
determining whether the input power at a current time point is greater than the input power at the previous time point;
if the input power at the current time point is greater than the input power at the previous time point, providing the disturbed quantity with a disturbance direction identical to that of the previous time point; and
if the input power at the current time point is less than or equal to the input power at the previous time point, providing the disturbed quantity with the disturbance direction opposite to that of the previous time point.

* * * * *